April 10, 1945. H. E. MALONE 2,373,130
HEAT MOTOR ACTUATED DEVICE
Filed Jan. 27, 1941 2 Sheets-Sheet 2
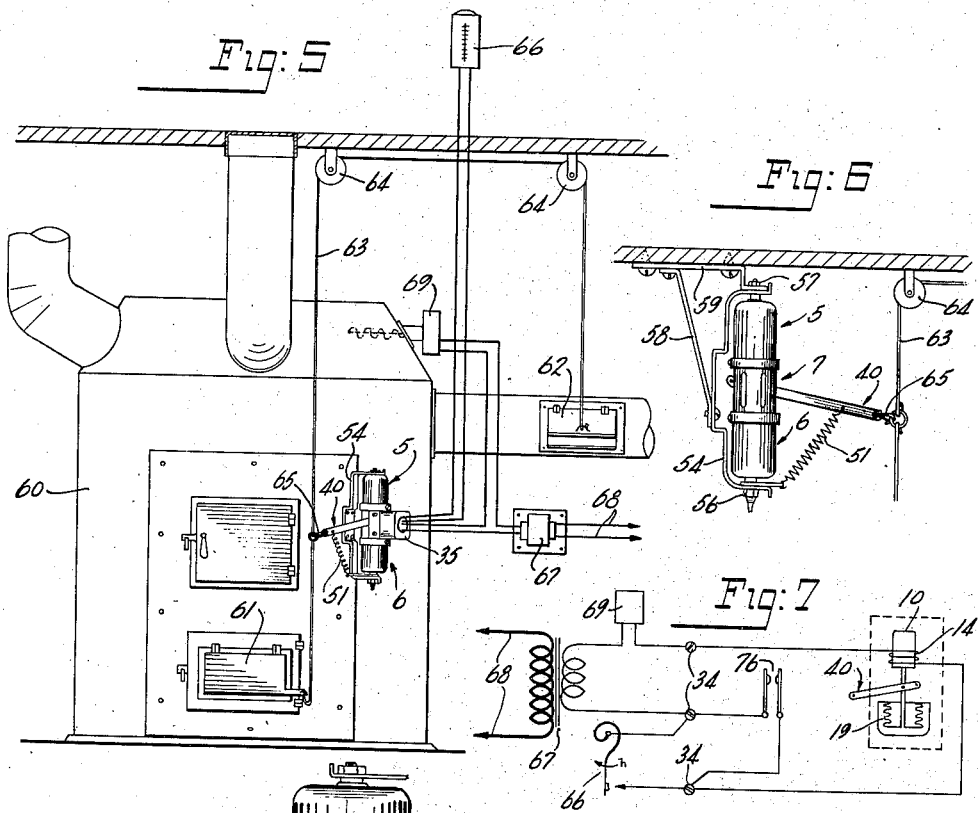
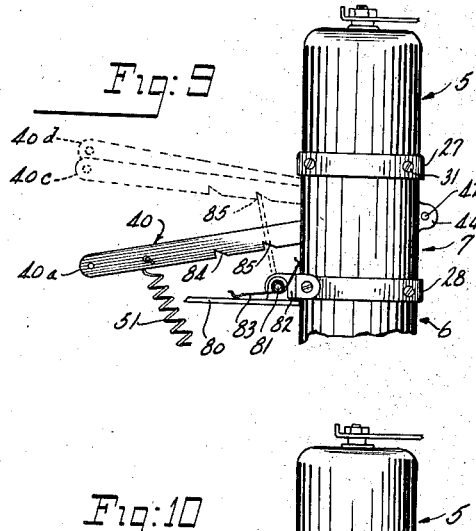
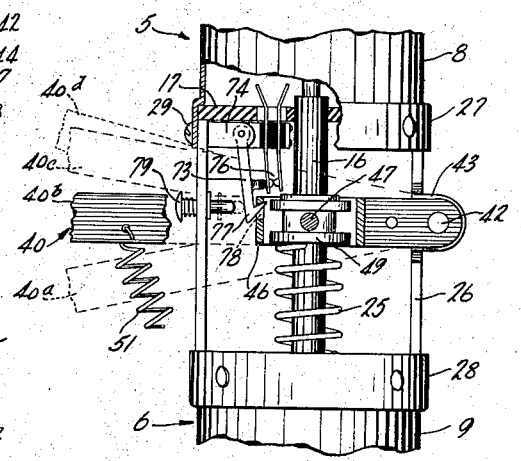
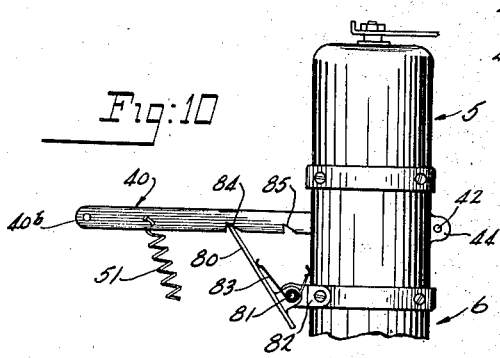
INVENTOR.
Homer E. Malone
ATTORNEY.

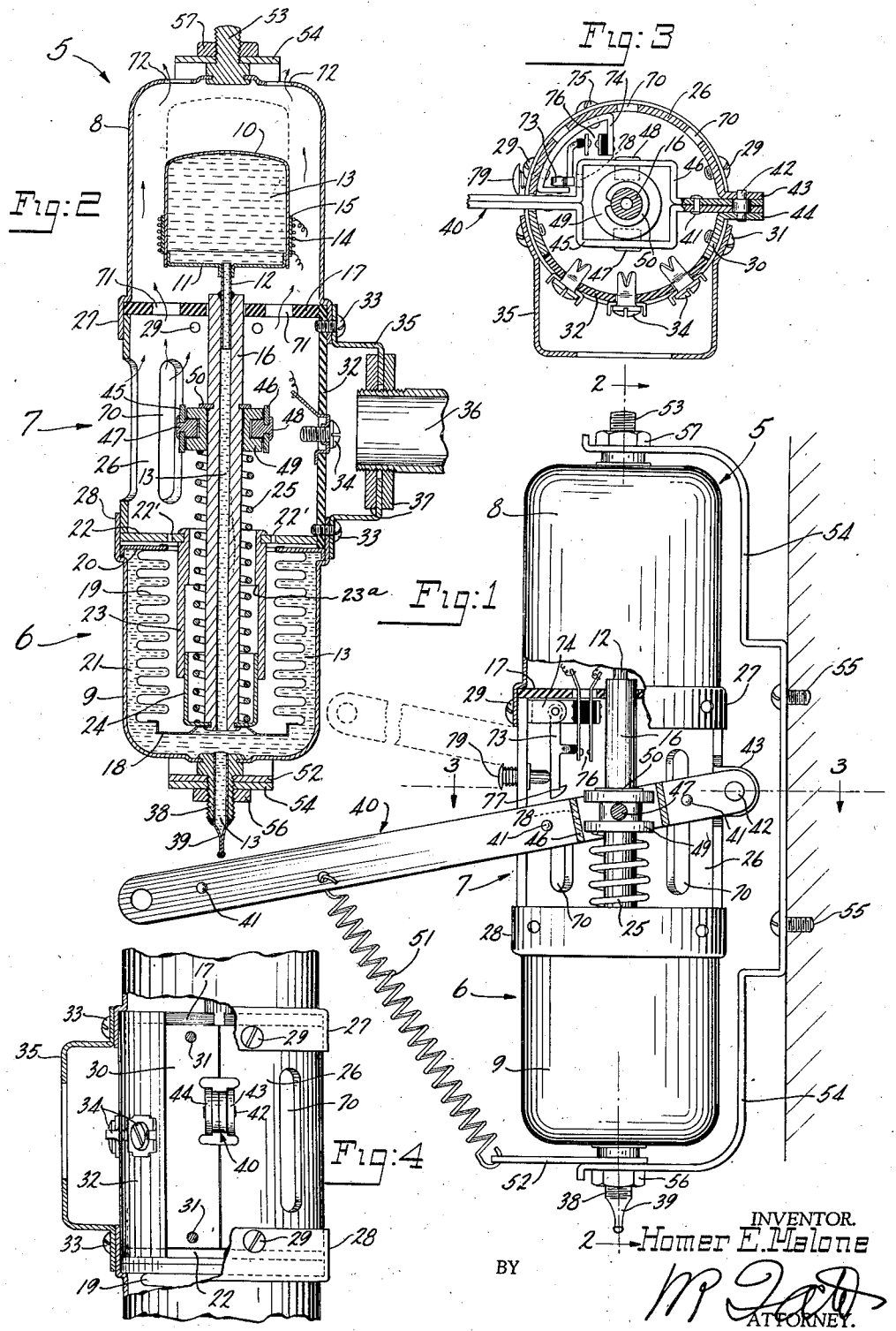

Patented Apr. 10, 1945

2,373,130

UNITED STATES PATENT OFFICE 2,373,130

HEAT MOTOR ACTUATED DEVICE

Homer E. Malone, Milwaukee, Wis., assignor to Perfex Corporation, Milwaukee, Wis., a corporation of Wisconsin Application January 27, 1941, Serial No. 376,035

16 Claims. (Cl. 60—25)

This invention relates generally to control devices and more particularly to control devices wherein a heat motor is employed to actuate the device from one control position to another.

The primary object of the invention is to produce a new and improved heat motor actuated control device wherein the various elements of the device are so formed, arranged and related that a compact, unitary structure is attained, which device is easy to assemble, operates in a positive and reliable manner, and which provides improved operating characteristics.

Another object of the invention is to provide a heat motor actuated device in which the elements thereof are arranged and assembled in a novel manner to produce their most efficient coaction and in which the compact unitary structure is symmetrically arranged to present an enhanced appearance when in its supported position.

Heat motor actuated devices are very desirable for use as damper operators in domestic heating plants, since they are silent in operation, producing no hum or gear noise, have no fast moving parts, and require no lubrication or constant servicing. It is an object of the present invention to produce a new and improved heat motor actuated device which is adapted to operate the check and draft dampers of a furnace in a more efficient and reliable manner.

Another object of the invention is to provide a new and improved mounting and supporting means for a damper operator whereby the device may be supported at its ends and axially rotated to any desired position for correct operation of the damper arm and also may be readily mounted to the best advantage in a vertical position upon or adjacent to a furnace.

A further object is to provide a new and improved arrangement of the elements of a heat motor actuated damper operator in which the damper operating arm is arranged between the ends of the device while the pressure generator or boiler and the pressure responsive element or bellows are arranged at opposite ends of the device.

Another object is to provide an electrical damper operating device for the draft and check dampers of a furnace in which the draft damper is automatically closed and the check damper is opened upon the occurrence of power failure or any disablement of the device itself.

An additional object of the invention is to provide a damper operating device in which the damper arm may be manually moved and latched in position to cause opening of the draft damper in the event of power failure, and which upon resumption of power is automatically recycled and restored to its automatic operation under control of a thermostat for example.

Another object is to provide a strain release arrangement for a heat motor actuated damper operator in which the operating bellows is enabled to expand beyond a predetermined point under continued operation of the heat motor after the damper arm has reached its fully operated position, so that no strain upon the elements takes place.

Other objects and advantages reside in certain features of construction, arrangement and operation of the various parts which are more fully described in the specification, particularly pointed out in the appended claims, and illustrated in a preferred embodiment in the accompanying drawings.

In the drawings:

Fig. 1 illustrates a side elevational view of the heat motor damper operator with a portion broken away;

Fig. 2 is a cross-sectional side view taken along the line 2—2 of Fig. 1;

Fig. 3 is a cross-sectional top view taken along the line 3—3 of Fig. 1;

Fig. 4 is a side view of a portion of the device;

Fig. 5 illustrates diagrammaticaly a heating system embodying a heat motor damper operator for regulating the temperature of a room;

Fig. 6 illustrates a modified mounting arrangement for the damper operator;

Fig. 7 is a schematic wiring diagram illustrating the circuit connections for operating the device;

Fig. 8 is a fragmentary portion of the damper operator showing the position of the parts when the device is operated manually as during a period of power failure;

Fig. 9 is a fragmentary view showing a modified arrangement providing for manual operation and automatic recycling; while Fig. 10 shows an operated position of the device of Fig. 9.

Although the invention may be embodied in different forms of control apparatus, the device as shown in the drawings is particularly adapted for use as a damper operator for heating plants. In its preferred form the heat motor actuated device is constructed as a single, compact unitary structure of cylindrical shape and comprising an upper portion indicated generally at 5 containing the so-called boiler or electrically actuated thermal motor, a lower portion indicated generally at 6 containing the pressure responsive element or bellows, and a central portion indicated at 7 including the damper operating means, electrical connections and other elements. In its detailed construction the elements 5 and 6 are contained and housed within cylindrical cup-shaped members or shells 8 and 9 respectively having relatively thin walls with their open ends facing each other. The shell 8 houses the pressure generator or boiler 10 which comprises a container having thin walls of heat conducting material such as copper, and a bottom wall 11 preferably soldered thereto. Projecting centrally from the bottom wall 11 is a small hollow tube 12. The boiler 10 is filled with a suitable volatile fluid 13 wherein fluid pressure is developed by the heating of the liquid. The liquid is vaporized by means of an electric heater 14, several turns of which are wound around the lower portion of the boiler 10 and electrically insulated therefrom by the strip of insulating material 15. The small tube 12 of the boiler 10 is connected at its other end as by soldering with an operating stem or rod 16 having an axial bore therein to provide communication of the liquid from the boiler 10 to the lower portion of the device. The stem 16 extends through the portion 7 of the damper operator and is partially guided in its position by means of a flat insulating plate 17 arranged at the open end of the shell 8 and through which the stem extends. This plate 17 also serves as a partition wall isolating and protecting the boiler 10 in the upper shell 8 from the elements in the intermediate wall portion 7. At its lower end the stem 16 is attached to a plate member 18 to which one end of an expansible and contractible pressure responsive device or bellows 19 is connected as shown. The other end of the bellows 19 is suitably connected and soldered to a retaining plate 20 sealed in the open end of the shell 9. The chamber 21 formed between the outside wall of the bellows 19 and the inner wall of the shell 9 is completely filled with the volatile liquid 13 which also fills up the axial bore of the stem 16 as shown in Fig. 2. A metal supporting plate 22 is fixedly positioned at the open end of the shell 9 on top of the plate 20 and is provided with a number of air passages 22' extending to the inside of the bellows 19. The plate 22 serves as a partition wall protecting the bellows 19 in the lower shell 9 from the elements in the intermediate portion 7. Surrounding the lower end of stem 16 and extending within the bellows 19 is a guiding sleeve 23 which is fastened at one end as shown, to the plate 22 and projects downward toward the movable or operating end of the bellows. A second sleeve member 24 arranged in telescopic relationship to the sleeve 23 is fastened at one end to the bottom end of the stem 16. The purpose of the sleeves 23 and 24 is to serve as guides for the lower end of the stem 16 and for the movable end of the bellows. Sleeve 23 is also provided with an internal abutting shoulder 23a adapted to be engaged by the end of sleeve 24 in order to limit the contraction movement of the bellows. A strain release coil spring 25 surrounds the lower portion of the stem 16 within the bellows 19 and normally bears against the sleeve 24.

The arrangement of the foregoing elements is such that the vaporization of the liquid 13 in the boiler 10 by energization of the heater 14 forces a portion of the liquid 13 through the hollow stem 16 and out of the bottom end of the stem so that the bellows 19 is contracted, causing the sleeves 23 and 24 to telescope, and producing an upward movement of the stem 16 together with the boiler 10.

The shells 8 and 9 are connected together by a semicircular metal wall section 26 bridging the portion 7 of the device and extending between flange portions 27 and 28 formed around the open end of shells 8 and 9 respectively. A number of screws 29 threaded into the wall 26 and passing through the flanges 27 and 28 serve to support these elements in position. As seen more clearly in Figs. 3 and 4, a second and smaller wall section 30 is provided in the portion 7 of the device and is held to the flanges 27 and 28 by a pair of screws 31. To complete the housing portion 7 a curved terminal plate 32 made of insulating material is provided. This terminal plate 32 engages the flanges 27 and 28 and is held in place by screws 33. The terminal plate 32 engages the outside peripheries of the insulating plate 17 and the plate 22, while the metal walls 26 and 30 abut or engage the underside of these plates and thereby properly serve to space the plates apart. A number of terminal screws and associated wiring tabs 34 are arranged centrally of the insulating plate 32 for the purpose of establishing the electrical connections to the device. Also arranged upon the insulating plate 32 and secured by screws 31 and 33 is a conduit outlet box 35 for connecting a conduit 36 thereto as by means of a pair of locking nuts 37.

In order to provide a convenient means for filling the device with the volatile fluid 13 the shell 9 is provided at its lower end with a hollow laterally threaded stud 38 fitted with a tube 39 which may be suitably pinched and soldered at its end after the filling operation has been completed. The filling operation is preferably performed at a slightly elevated temperature value beyond that in which the device is arranged normally to operate so that the bellows 19 is fully expanded at ambient temperatures when not actuated by the action of the boiler 10.

The means actuated by the device comprises a damper arm indicated generally at 40 which is positioned in the portion 7 of the device between the shell 8 containing the boiler 10 and the shell 9 containing the bellows 19, so that the damper arm 40 is symmetrically arranged between the ends of the device in a position where its operation can be readily correlated with the arrangement of the furnace dampers. The damper arm 40 is preferably made of two similar pieces of flat metal riveted together by rivets 41 at certain intervals as indicated and pivoted at one end by a pin 42 extending through both portions of the damper arm 40. The pin 42 is pivotally supported in the intermediate portion 7 of the device by means of ear portions 43 and 44 formed in the wall plates 26 and 30 respectively as shown in Fig. 4. The portion of the damper arm 40 extending through and within the intermediate portion 7 of the device is provided with slightly offset portions at 45 and 46 to provide clearance for the stem 16 as shown in Fig. 3. The damper arm 40 is connected to the stem 16 for operation thereby by means of pins 47 and 48 secured to the offset portions 45 and 46 of the damper arm and loosely and slidably engaging a collar 49 through which the stem 16 extends. The collar 49 is arranged loosely on the stem 16 but is prevented from moving upwardly thereon by means of a split washer 50 which is secured to the stem 16. In its normal position the strain release coil spring 25 is in engagement with the lower face of collar 49 and the lower end of stem 16 so that the damper arm 40 is held in position on the stem solely by the tension stored in spring 25. With the damper arm arranged as pointed out, it is seen that upon upward movement of the stem 16 the pins 47 and 48 engaging the collar 49 on the stem cause the damper arm 40 to be likewise moved upwardly about its pivot 42.

In order to bias the damper arm 40 in its lowermost or draft closing position as shown in Fig. 1, and to provide a means for always restoring the damper arm to this position when the heat motor is not energized or is disabled, a coil spring 51 is provided which at one end is connected near the operating end of the damper 40 and at its other end to a bracket 52 arranged rigidly on the lower end of the device.

The damper operating device is arranged for mounting in various positions depending upon the type of furnace installation in which it is to be placed. The device is preferably supported from its ends so that it may be axially rotated to any desired position in which the damper arm may be most advantageously arranged to operate the various dampers of the furnace. At its upper end the shell 8 is provided with a threaded stud 53 secured thereto, while the lower end of shell 9, as has been pointed out, carries the stud 38. These studs 38 and 53 are adapted to be engaged by the forked ends of a flat metal supporting bracket 54 which in turn may be supported as by screws 55 upon a wall surface as shown in Fig. 1 or the side of a furnace as indicated in Fig. 5. Since the supporting bracket 54 engages only the ends of the damper operator, it may be readily rotated axially to position the damper arm 40 in any desired position after which the locking nuts 56 and 57 may be tightened to lock the device in its set position. Another manner in which the damper operator may be supported in a vertical position is from a ceiling, for example, as illustrated in Fig. 6. With this arrangement it is necessary that additional bracket members 58 and 59 be provided for supporting the device in the position as shown. By reversing the position of brackets 58 and 59 and placing them on the bottom of the unit, the device may be supported from a shelf for example. In all positions of mounting it is essential that the device be arranged vertically with the boiler 10 on top so that the elements and liquid 13 will function properly.

As has been stated, the device has been illustrated for use as a damper operator arranged to control the operation of a furnace. As illustrated in Fig. 5, the furnace 60 of conventional form is provided with a draft damper 61 and a stack check damper 62 which are connected together by a chain or cable 63 in the usual manner, the chain passing over suitable pulleys 64 on the ceiling. The damper operator may be mounted upon the side of the furnace 60 as shown and is arranged with its arm 40 projecting therefrom into a position where connection with the cable 63 is most advantageously established as by means of a detachable snap hook 65. The damper operator is usually controlled automatically by a room thermostat such as 66 in accordance with the demand for heat in the room in which the thermostat 66 is located. In order to provide electrical power for operating the damper operator a step down transformer 67 is provided having connection with a suitable source of commercial power 68. It is customary in furnace installations to provide a limit control such as shown at 69 of well known construction to prevent excessive heat output from the furnace 60. The foregoing arrangement represents a typical installation for a heating plant in which the improved damper operator of the present invention may be utilized.

In the normal operation of the damper operator and the heating plant, assume that the room temperature thermostat 66 functions in response to a drop in temperature to close its contacts. As shown in Fig. 7 this results in the establishment of an electrical circuit including the thermostat contacts 66, the secondary winding of the transformer 67, the limit control switch 69, the terminals 34 arranged upon the insulating plate 32 through which the conductors pass, and through the heater winding 14 of the boiler 10. The current passing through the winding 14 causes heating of the volatile liquid 13 through the thin walls of the boiler 10 so that the liquid within the boiler is gradually volatized and a pressure condition is produced in the boiler chamber which forces the remaining liquid outwardly through the tube 12, the hollow portion of the stem 16, and into the space between the shell 9 and the outside of bellows 19. This action continues until all of the liquid is expelled or driven from the boiler 10 at which time this hydraulic action upon the bellows ceases since there is no more liquid within the boiler that can be vaporized. The arrangement of the heating winding 14 upon the lower portion of the boiler 10 insures that all of the fluid in the boiler is vaporized and also enables the heat to be dissipated more rapidly through the thin upper walls of the boiler when the heater is deenergized. Continued energization of the heater 14 will therefore not effect further contraction of the bellows 19 after it reaches a certain stage and the damper arm is fully operated. As the bellows 19 is contracted by the action of the liquid, the stem 16 is gradually forced upwardly, causing the boiler 10 likewise to move upwardly within the shell 8. This upward movement of stem 16 also results in the upward movement of the free end of damper arm 40 about its pivot 42 and against the tension exerted by the spring 51 attached to the damper arm. The movement of the stem 16 likewise results in the telescoping action of sleeves 23 and 24, serving to guide the lower end of the stem and to hold the movable portion of the bellows in its proper position when contracted. The air within the bellows 19 and surrounding the sleeves 23 and 24 is expelled through the openings 22' in the plate 22 when the bellows is contracted so as to introduce no appreciable resistance to the operation of the device. Since the collar 49 to which the damper arm 40 is connected is held upon the stem 16 between the split ring 50 and the end of the spring 25, the movement of the stem 16 is communicated directly to the damper arm 40.

The upward movement of the damper arm 40 results in the shifting of the damper cable 63 so that the draft damper 61 is opened and the check damper 62 is closed, thereby promoting increased combustion within the furnace so that more heat is propagated into the room in which the thermostat 66 is located. As long as the room thermostat 66 is operated the heater 14 of the damper operating device remains energized. Upon the damper arm 40 moving to its extreme upper position and engaging the edge of flange 27 on cup 8 as indicated in Fig. 1, the bellows 19 may continue to be contracted an additional slight amount by the continued heating of the boiler 10 by the heater 14. Should this occur the over-expansion of bellows 19 is absorbed by the strain release spring 25, which upon the further telescoping action of sleeves 23 and 24 causes the spring 25 to be compressed and the collar 49 to slide on the stem 16. This action relieves the strain upon the bellows 19 and prevents rupture or undue buckling of the same. This strain release spring 25 therefore only functions whenever the damper arm 40 reaches its extreme operating position or in the event that for some abnormal reason it becomes stuck in any intermediate position while the heater 14 of the boiler 10 remains energized.

In the remote event that the damper operating device should become disabled for some reason such as, for example, rupture of the bellows 19, leakage of the liquid from the boiler 10, or open circuiting of the heater 14 after its energization, the damper arm 40 would not remain stuck in any intermediate position but would immediately return to its lowermost position as shown in Fig. 1 by the action of the spring 51 attached to the damper arm, which at all times biases the damper arm to its lowermost closed position. When any such abnormal action occurs the draft damper 61 would be closed and the check damper 62 opened so that no dangerous heat conditions would be produced due to excessive operation of the furnace 60. It may be pointed out that the tension exerted by the spring 51 upon the damper arm 40 is insufficient to appreciably affect the reliable operation of the damper arm by the action of the boiler 10 and bellows 19. Its purpose is merely to insure that the device will operate to a "fail-safe" condition when the damper operator no longer functions in the proper manner.

When the room thermostat 66 has been satisfied, it opens its contacts, thereby interrupting the energizing circuit to the heater 14. This action causes the boiler 10 to immediately begin to cool off condensing the vapor therein and reducing the pressure in the boiler 10 so that the liquid 13 within the stem 16 and the shell 9 can flow back into the boiler. In order to assist in cooling the boiler 10, a series of apertures are provided within the device including a number of openings 70 in the wall 26, openings 71 in the insulating plate 17, and openings 72 in the top of the shell 8. By this means a circulation of cooling ambient air is promoted about the outside of the boiler 10 to assist in restoring the liquid to its cool state. The bellows 19, due to its inherent expansion characteristics, forces a portion of the liquid 13 out of the chamber 21, and causes the movement of the stem 16 to a lower position, carrying along with it the boiler 10. This movement is assisted somewhat by the action of the biasing spring 51 attached to the damper 40. When the liquid within the boiler 10 reaches a condition of stability, the motion of the damper arm is halted. There should be sufficient slack provided in the cable 63 to insure that the draft damper 61 is completely closed and the check damper 62 is fully opened when the furnace is shut down.

Whenever it is necessary to stoke or fire the furnace 60 it is usually desirable to move the dampers to a position in which both the check and draft dampers are closed. This may readily be accomplished by removing the snap buckle 65 connected to the end of the damper arm 40, from its connection with the ring on the cable 63. The dampers 61 and 62 may thereby be manually shifted by grasping the cable 63, and after the firing operation is performed the snap buckle 65 is again connected to the cable 63 to resume the automatic control of the dampers by the damper operator.

It is desirable that the damper arm 40 be operated manually to continue the operation of the furnace 60 in the event of the occurrence of a power failure. In this event when the manual operation is performed it is also desirable that some provision be made for automatically restoring the damper operator from manual control to its automatic operation. The invention contemplates such a manual control and recycle feature. Referring specifically to Figs. 1, 3 and 8, a pivoted latch member 73 is arranged and supported within the intermediate portion 7 of the device by means of a bracket 74 supported from the inside of the wall member 26 by means of screws 75 and 29. The latch 73 is provided with an offset extension which is adapted to function in a manner to close a set of recycle contacts 76 supported in insulated relationship upon the supporting bracket 74. The end of latch 73 is also provided with a trigger portion 77 which is adapted to establish latching relationship with a notched opening 78 cut in the offset portion 46 of damper arm 40. A similar notched portion is formed on the bottom edge of the offset portion 46 to coact with the trigger 77. A manual push button 79 which is spring-pressed outwardly and extends through the wall 26 is adapted to engage and move the lower end of latch 73 when pushed inwardly.

In the normal operation of the damper operating device and the damper arm 40, the foregoing elements are arranged in such a manner that they normally do not interfere with the operation of the device. However, in the event that there should be a failure of electrical power, the damper arm as a result would not be moved upwardly and the operation of the device would not take place automatically under control of the thermostat 66. In this event manual control must be exercised and this may be performed by manually grasping the lever 40 with one end and then moving it upwardly from the lowermost position 40a indicated in Fig. 8 to an intermediate position 40b so that the draft damper 61 is partially opened and the check damper 62 is partially closed. At the same time that damper arm 40 is operated the manual push button 79 must be pressed inwardly. This swings the trigger end 77 of latch 73 into engagement with the notch 78 of the damper arm 40 and holds the damper arm in its set position. The trigger 77 and notch 78 are so arranged that when the pressure upon the push button 79 is removed, the elements 77 and 78 remain locked in engagement, as illustrated in Fig. 8. This latching action is further assisted by the tension exerted by the biasing coil spring 51. The operating movement of the latching member 73 also causes the closure of the recycle contacts 76, but since current is not now available no action occurs. This position of the arm 40 provides for a moderate amount of heat from the furnace by manual control during a period of power failure. If more heat is necessary the damper arm 40 may be moved to its full upward position, as indicated at 40c in Fig. 8, to induce maximum draft conditions within the furnace. The trigger 77 is then latched to the lower edge of the portion 46 of damper arm 40. It will be noted that the latch member 73 when in the operated position as shown in Fig. 8 is exerting a biasing force against the recycle contacts 76 thereby storing biasing tension in the contact springs. In the event that power resumption does not take place immediately and the demand for heat by the occupant has been satisfied, it is merely necessary to manually grasp the damper arm 40 and move it upward slightly. This action enables the trigger 77 to disengage itself from the damper arm and under the tension stored in recycle contacts 76 the latch member 73 is moved outwardly. This permits the damper arm 40 to be lowered to draft closing position. If the damper arm is latched as above described upon the resumption of electrical power, the recycle contacts 76, which as illustrated in Fig. 7 are in shunt of the room thermostat 66, will establish an energizing circuit for the heater winding 14, independent of the room thermostat. This action will cause movement of the damper operator and arm 40 toward its upward or full damper opening position 40c resulting in the unlatching of latching lever 73 in the manner pointed out and the restoration of the device from manual control to automatic control by the room thermostat. As soon as the latch 73 is disconnected from the damper arm 40 the recycle contacts 76 are automatically opened. It should be noted that whenever the damper arm 40 is operated manually the bellows 19 will be compressed by the upward movement of the stem 16, but this action will have no effect whatever upon the volatile liquid within the system except to cause some of it to pass out from the boiler 10 through the stem 16.

If desired, the intermediate latched position 40b of arm 40 may also be utilized for a stoking position, the chain 63 being arranged so that the dampers 61 and 62 are both closed when the arm is in this position. Due to the recycling contact being closed at this time, the heater 14 will be energized, thus tending to cause the regulator to return to automatic control. However, as an appreciable time lag occurs between energization of the heater 14 and movement of the damper arm 40, a period is provided during which the furnace may be stoked with both dampers closed.

Under certain conditions it may not be desirable to employ the fully automatic recycle feature on the damper operating device but to control the same directly from the room thermostat instead of the recycle contacts 76. Such an arrangement is disclosed in the modified form of the invention illustrated in Figs. 9 and 10. In this arrangement a latching lever 80 is provided which is pivoted by a pin 81 supported from a bracket 82 mounted on the side of the damper device. The latch 80 is biased to the normal or unlatched position shown in Fig. 9 by means of a torsion spring 83 having one end bearing against the latch 80 and the other end against the side of the casing of the device, the intermediate portion encircling the pivot pin 81. In this arrangement the damper arm 40 is also provided with a pair of latching notches 84 and 85.

In the foregoing arrangement upon the discontinuance of electrical power from the damper operating device, the damper arm 40 may be manually moved upward against the tension of spring 51 to draft open position. The latch 80 is then manually rotated about pivot 81 and against the tension of spring 83 to a position where it is in engagement with either the notch 84 or notch 85, depending on how far upward the damper is moved, the first position in notch 84 being the intermediate or stoking position 40b of the damper arm and the second position in notch 85 being the wide open position. The tension of spring 51 is sufficient to maintain the end of latch 80 in the notch 84 as long as no power is on the device. However, upon the resumption of electrical service the broiler heater is again energized by the room thermostat to compress the bellows, forcing the damper arm 40 slightly farther in an upward direction as illustrated in Fig. 9 at 40d. This further upward movement of the damper arm results in releasing the end of latch 80 from notch 84 or 85 so that the tension stored in spring 83 will exert itself to move the latch 80 to the normal position shown in Fig. 9. In this embodiment of the invention the room thermostat effects complete control over the damper operating device upon the resumption of power and no recycle contacts 76 are employed as in Fig. 8.

From the foregoing description it is seen that a new and improved heat motor actuated device has been devised which presents an enhanced symmetrical appearance, is simple in its operation and in the number of elements comprising the same, embodies improved operating characteristics, and is readily adapted for universal mounting.

The invention is capable of embodiment in various other forms, in addition to those illustrated and described. It is therefore to be understood that the same is not to be restricted to the precise embodiment disclosed but only to the extent of the scope of the appended claims.

What is claimed is:

1. In a heat motor actuated device, a unitary structure comprising an upstanding elongated casing enclosing a pressure generator arranged at the upper end portion thereof, a pressure responsive element arranged at the lower end portion of said casing, a connection between the pressure generator and pressure responsive element whereby the latter is operated by the pressure generator, and an actuating arm actuated by the pressure responsive element and arranged between the pressure generator and the pressure responsive element, said actuating arm extending from said casing at a point midway between the end portions thereof.

2. In a heat motor actuated device, a unitary structure comprising an elongated casing formed of oppositely disposed shell portions and an intermediate wall portion connecting said shell portions, a pressure generator arranged within one of said shell portions, a pressure responsive element arranged within the other of said shell portions, a connection between the pressure generator and pressure responsive element whereby the latter is operated by the pressure generator, and an actuating arm actuated by said pressure responsive element and arranged in said intermediate wall portion to project outwardly from said elongated casing between the ends thereof.

3. In a heat motor actuated device, a unitary structure comprising an elongated casing formed of oppositely disposed shell portions and an intermediate wall portion connecting said shell portions, a pressure generator arranged within one of said shell portions, a pressure responsive element arranged within the other of said shell portions, a connection between the pressure generator and pressure responsive element whereby the latter is operated by the pressure generator, an actuating arm actuated by said pressure responsive element and arranged in said intermediate wall portion to project outwardly from said elongated casing between the ends thereof, and means for supporting said elongated casing from the outer ends of each shell portion whereby said elongated casing is adapted to be axially rotated to shift the actuating arm to any desired position.

4. In a heat motor actuated device, a unitary structure comprising an elongated casing including oppositely disposed shell portions and an intermediate wall portion connecting the shell portions, a separate partition wall separating the interior of each of said shell portions from the interior of the intermediate wall portion, a pressure generator arranged within one of the shell portions, a pressure responsive element arranged within the other of said shell portions, a connection between the pressure generator and pressure responsive element whereby the latter is operated by the pressure generator, and an actuating arm actuated by said pressure responsive element and arranged in said intermediate wall portion, said actuating arm projecting outwardly from said intermediate wall portion and being isolated by said partition walls from said pressure generator and said pressure responsive element.

5. In a heat motor actuated device, a unitary structure comprising an elongated casing including oppositely disposed shell portions and an intermediate wall portion connecting the shell portions, separate partition walls separating the interior of each of said shell portions from the interior of the intermediate wall portion, a pressure generator arranged within one of said shell portions, a pressure responsive element arranged within the other of said shell portions, an operating stem connecting said pressure generator with said pressure responsive element, and placing their interiors in communication, said operating stem extending axially across said intermediate wall portion and through said partition walls, said operating stem being operated by said pressure responsive element in response to pressure variations produced by said pressure generator, and an actuating arm in said intermediate wall portion and between said partition walls, said actuating arm projecting outwardly through said intermediate wall portion and being operated by said operating stem in a direction parallel to the longitudinal axis of said casing.

6. In a heat motor actuated device, a unitary structure comprising an elongated casing including oppositely disposed shell portions and an intermediate wall portion connecting the shell portions, separate partition walls separating the interior of each of said shell portions from the interior of the intermediate wall portion, a pressure generator arranged within one of said shell portions, a pressure responsive element within the other of said shell portions, an operating stem connecting said pressure generator with said pressure responsive element and placing their interiors in communication, said operating stem extending through said partition walls and across said intermediate wall portion, said pressure generator, said pressure responsive element and said operating stem all being arranged in axial alignment within said elongated casing, said operating stem being actuated by said pressure responsive element in response to pressure variations produced by said pressure generator and being guided and supported in its operating movement by said partition walls, and an actuating arm pivoted to said intermediate wall portion between said partition walls and actuated by said operating stem, said actuating arm projecting outwardly through said intermediate wall portion and having its other end movable in a direction parallel to the axis of the elongated casing.

7. In a heat motor actuated device, an outside casing, a pressure generator, a pressure responsive element below and spaced from said pressure generator, said pressure responsive element having a fixed wall portion partly forming said outside casing, and a movable wall portion, an operating stem connected to the movable wall portion of said pressure responsive element and extending toward said pressure generator, an actuating arm located in the space between said pressure generator and said pressure responsive element, said arm extending through said casing and associated with said operating stem for actuation thereby, said actuating arm extending laterally of said pressure responsive element, and means for establishing fluid communication between said pressure generator and said pressure responsive element.

8. In a heat motor actuated device, a pressure generator, a pressure responsive element located below the pressure generator and having a movable portion and a fixed portion, an operating stem connecting said pressure generator with the movable portion of said pressure responsive element, said operating stem placing the interiors of the pressure generator and the pressure responsive element in communication, means for supporting the fixed portion of said pressure responsive element, means for producing pressure variations in said pressure generator to operate said pressure responsive element whereby said operating stem and said pressure generator are both shifted with respect to the supported portion of said pressure responsive element, an operating member arranged for actuation by said operating stem, an actuating arm operated by said operating member, and a strain release spring extending between said operating member and the movable portion of said pressure responsive element whereby said pressure responsive element can continue to be operated by said pressure generator after said actuating arm has been fully operated.

9. In a heat motor actuated device, a pressure generator, a pressure responsive element having a movable end and a fixed end, an operating stem connecting said pressure generator with the movable end of said pressure responsive element, said operating stem placing the interiors of the pressure generator and pressure responsive element in communication, said pressure generator, said pressure responsive element and said operating stem being all arranged in axial alignment, means for supporting the fixed end of said pressure responsive element, means for producing pressure variations in said pressure generator to operate said pressure responsive element whereby said operating stem and said pressure generator are both shifted axially with respect to the supported end of said pressure responsive element, an operating member arranged upon said operating stem and operated from one position to another by the movement of said operating stem, an actuating arm operated by said operating member, a strain release spring for holding said operating member in position upon said operating stem, said strain release spring arranged axially upon said operating stem and extending between said operating member and the movable end of said pressure responsive element whereby said pressure responsive element is enabled to operate an additional amount without straining the same after said actuating arm has been fully operated.

10. In a fluid heat motor actuated device, a pressure generator, a pressure responsive element comprising a bellows having a fixed wall at one end and a movable wall on the other end and being spaced from said pressure generator, an operating stem connecting said pressure generator with the movable wall of said bellows, said operating stem passing axially through said bellows to the movable wall thereof, a pressure chamber surrounding said bellows, said operating stem having an opening therein for establishing fluid pressure communication between said pressure generator and said pressure chamber, means whereby the movable wall of said bellows is actuated by the operation of said pressure generator to shift said operating stem and said pressure generator, and telescoping means connected to the movable and fixed walls of said bellows for guiding and supporting the operating stem in its axial movement.

11. A heat motor actuated device comprising a unitary structure of a substantially cylindrical elongated shape including oppositely disposed shell portions and an intermediate wall portion connecting said shell portions, all arranged in axial alignment, an actuating arm projecting outwardly from said intermediate wall portion, means disposed within said shell portions for operating said actuating arm from one position to the other in a direction parallel to the axis of said device, and means for supporting said device from its ends comprising a single bracket member removably engaging the outer ends of said shell portions and arranged so that said device may be axially rotated in its supported position to shift the actuating arm in any desired rotary position.

12. In a heat motor actuated device, an elongated casing, an electrically operated pressure generator arranged at one end of said casing, a pressure responsive element arranged at the other end of said casing and spaced from said pressure generator, a connnection between the pressure generator and pressure responsive element whereby the latter is operated by the former, an operating arm extending laterally of said casing in the space between the pressure generator and pressure responsive element, said operating arm being actuated by said pressure responsive element in response to pressure variations produced by said pressure generator, manually operated means arranged in the space between the pressure generator and pressure responsive element for locking said operating arm in an operated position in the event of electrical power failure of said pressure generator, and means also arranged in said space for automatically reoperating said pressure generator and releasing said operating arm upon the resumption of electrical power.

13. In a fluid heat motor actuated device, an elongated outside casing, a pressure generator in said casing at one end thereof, a bellows in said casing at the other end thereof and having its axis parallel to the long dimension of said casing, a cup-shaped member forming a portion of said outside casing, said cup-shaped member surrounding said bellows and being spaced therefrom, the bellows being closed at its end adjacent the bottom of said cup-shaped member and having its other end secured in a fluid tight manner to said cup-shaped member, a connection between the pressure generator and the space between the cup-shaped member and bellows whereby the bellows is operated by the pressure generator, an actuating arm projecting through said outside casing between the pressure generator and bellows, and means actuated by said bellows for actuating said actuating arm.

14. In a fluid heat motor actuated device, an elongated outside casing, a pressure generator in said casing at one end thereof, a bellows in said casing at the other end thereof and having its axis parallel to the long dimension of said casing, a cup-shaped member forming a portion of said outside casing, said cup-shaped member surrounding said bellows and being spaced therefrom, the bellows being closed at its end adjacent the bottom of said cup-shaped member and having its other end secured in a fluid tight manner to said cup-shaped member, a hollow operating stem connected to the closed end of the bellows and to the generator, said operating stem placing the interior of the generator into communication with the space between the cup-shaped member and bellows, and an actuating arm operated by said operating stem and projecting through the casing between the pressure generator and bellows.

15. In a heat motor, an upstanding elongated casing, a pressure generator located in the upper portion of the casing, a pressure responsive element located in the lower portion of the casing, a conduit extending from the lower portion of the pressure generator to the pressure responsive element whereby the latter is operated by the pressure generator, a lever arm extending from the interior of the casing to the exterior thereof and also extending between the pressure generator and pressure responsive element, said lever arm being actuated by the pressure responsive element.

16. In a heat motor, an upstanding elongated casing, a pressure generator located in the upper portion of the casing, a pressure responsive element located in the lower portion of the casing, a hollow operating stem extending from the lower portion of the pressure generator to a movable portion of the pressure responsive element whereby the latter is operated by the pressure generator and causes movement of said stem, a lever arm extending from the interior of the casing to the exterior thereof and also extending between the pressure generator and pressure responsive element, said lever arm being actuated by said stem.

HOMER E. MALONE.

CERTIFICATE OF CORRECTION.

Patent No. 2,373,130. April 10, 1945.

HOMER E. MALONE.

It is hereby certified that error appears in the printed specification of the above numbered patent requiring correction as follows: Page 2, first column, line 35, for the word "steps" read --stem--; page 3, second column, line 11, after "room" strike out "temperature"; page 4, second column, line 50, for "end" read --hand--; page 5, second column, line 10, for "broiler" read --boiler--; page 6, second column, line 4, claim 6, for "stew" read --stem--; and that the said Letters Patent should be read with this correction therein that the same may conform to the record of the case in the Patent Office.

Signed and sealed this 7th day of August, A. D. 1945.

Leslie Frazer (Seal)

Acting Commissioner of Patents.